Figure 3:
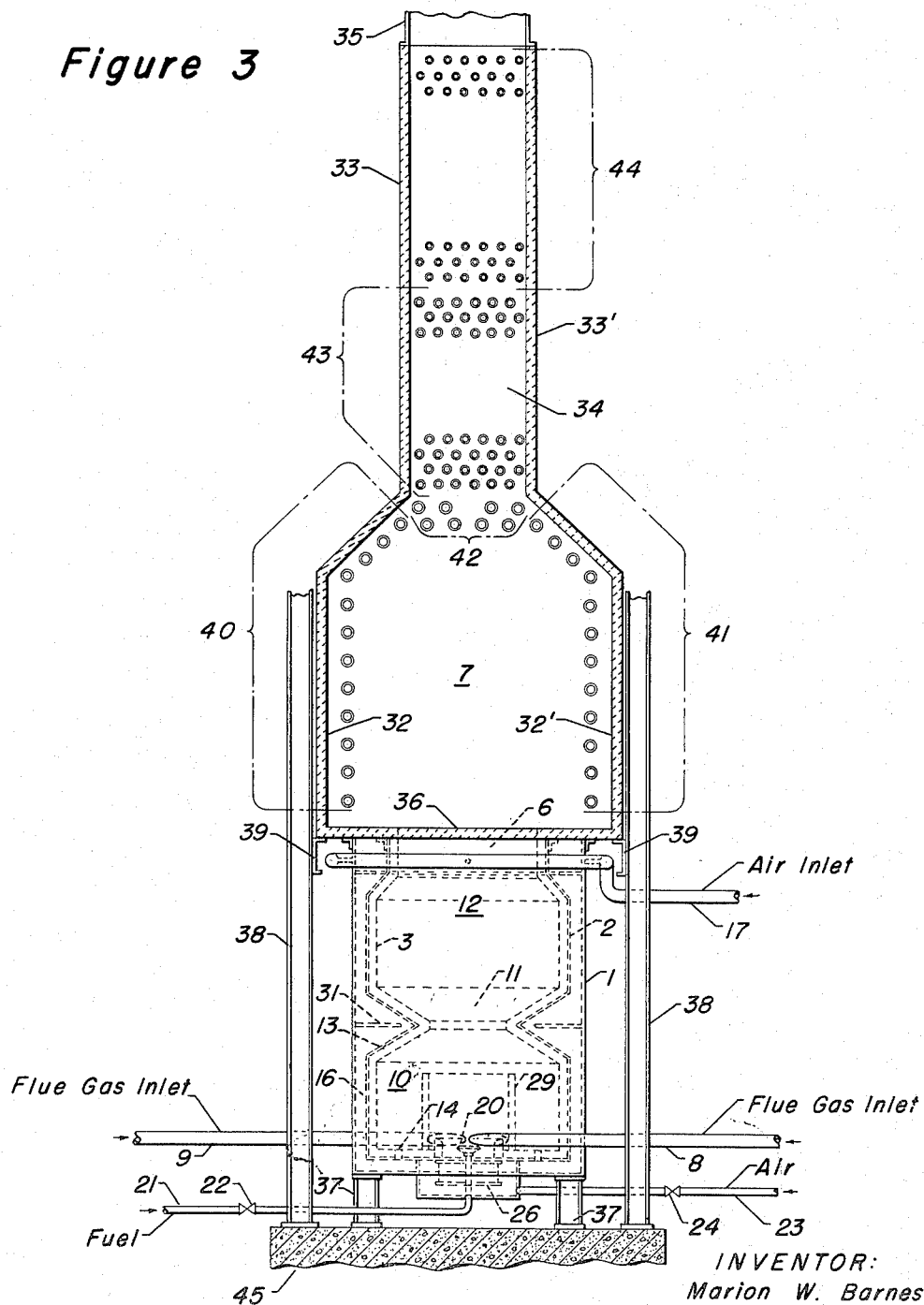

July 13, 1965
M. W. BARNES
3,194,215
CARBON MONOXIDE BURNER APPARATUS
Filed Nov. 7, 1962
2 Sheets-Sheet 1
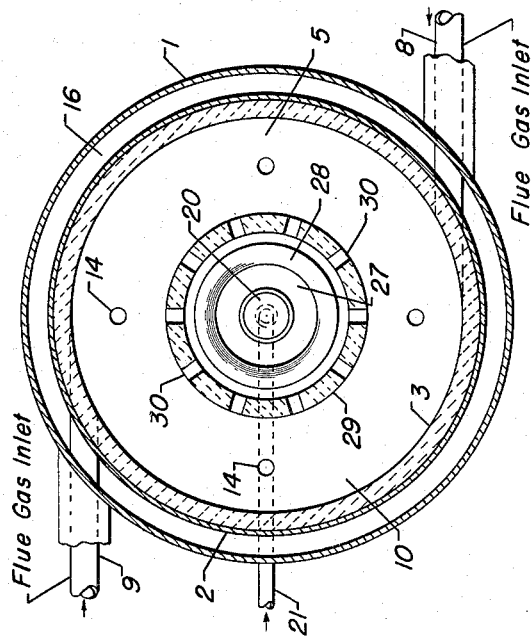
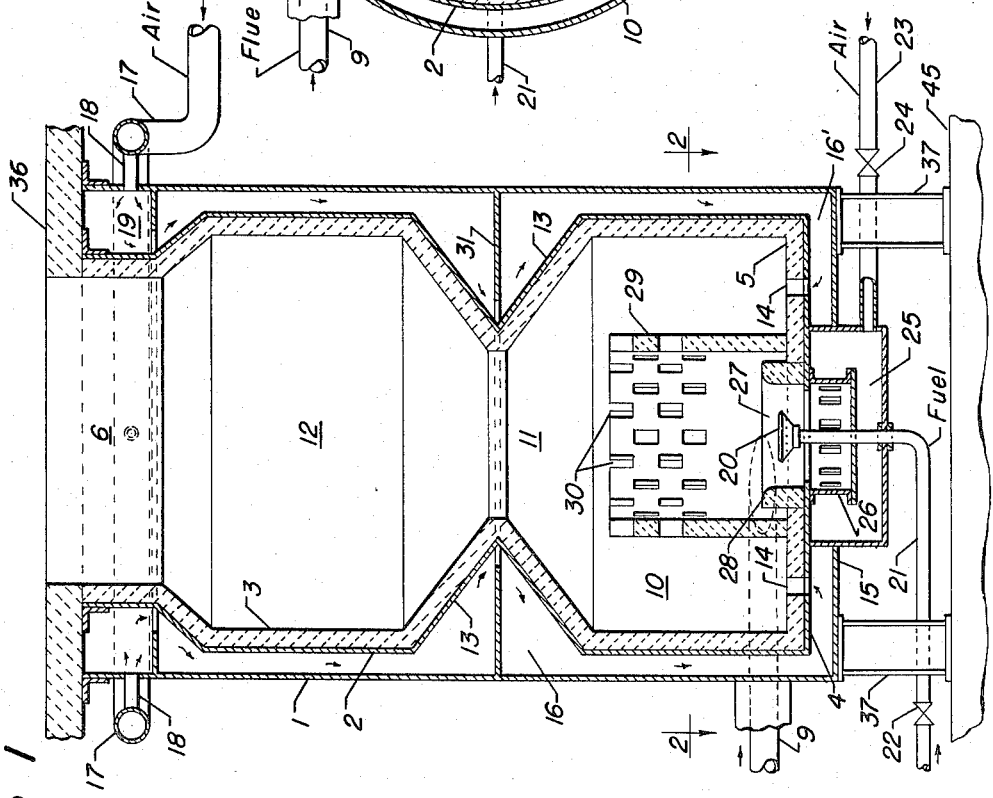
INVENTOR:
Marion W. Barnes
BY: James R. Hoatson Jr.
Philip T. Liggett
ATTORNEYS 3,194,215
CARBON MONOXIDE BURNER APPARATUS
Marion W. Barnes, Glenview, Ill., assignor to Universal Oil Products Company, Des Plaines, Ill., a corporation of Delaware
Filed Nov. 7, 1962, Ser. No. 236,099
4 Claims. (Cl. 122—235)

This application relates to an apparatus for effecting combustion of a gaseous fuel which contains a preponderance of inert material and a small percentage of combustible constituents, and more particularly to an improved burner which is adapted to utilize both the sensible heat and the heat of combustion available in an effluent gas stream.

Various furnace installations and processing chambers have flue gas and waste gas streams which carry carbon monoxide or other small percentages of combustibles so that there may be an advantageous recovery of heat from such streams. For example, a substantially oxygen free flue gas stream from a regenerator of a gas-oil catalytic cracking unit may have from 6.0 percent to 8.0 percent carbon monoxide (CO) content resulting from the carbon burning step carried out therein. In the fluidized catalytic cracking process or in moving bed catalytic operations as associated with hydrocarbon processing, there is a catalytic cracking of the gas-oil stream in the presence of particles of catalyst at a temperature in the 900° to 1050° F. range within a reaction zone to effect the disintegration of the heavier hydrocarbon molecules into more desirable components. The contact effects a carbon deposition on the catalyst particles such that carbonized particles continuously pass to a regeneration zone where they are contacted with air to effect the oxidation and removal of the deposit from the particles. Reactivated particles, with carbon deposition substantially eliminated, are periodically or continuously returned to the reaction zone at a high temperature, say of the order of 1050° to 1150° F. such that the cracking reaction may be continuously carried out in the separate confined reaction zone. In this type of operation, the effluent gas stream from the regenerator is substantially oxygen free, but may contain the aforesaid 6 to 8 percent carbon monoxide which may be made available as heat. This gas stream may also be of the order of 1100° F. so that it retains a large quantity of sensible heat.

There is no intent to limit the present burner apparatus to the handling of a regenerator effluent gas burner or any one type of waste gas stream since any carbon monoxide containing stream, or stream containing entrained combustibles, may be accommodated in the apparatus to provide for the recovery of usable heat. As used herein, the term "flue gas" relates generically to any stream carrying burnable components from which the heat of combustion may be made available.

In order to obtain substantially complete combustion in the waste gas stream, oxygen must be provided and introduced in a manner to effect intimate contact with the combustible molecules at a sufficiently high temperature and for a sufficient length of time. Thus, there is necessarily turbulence for mixing, high temperature to effect ignition and time and space to complete the oxidation reaction.

It is a principal object of the present invention to provide an apparatus design and arrangement which effects good mixing and turbulence through a centrifugally flowing stream and a burner arrangement in combination therewith providing a controlled autogenous temperature for the gas stream.

It is also an object of the present invention to provide a flue gas burner arrangement which may be used in combination with a vertically superimposed updraft form of heat absorption chamber having an optimum placing of the fluid conduits or tube banks.

In one embodiment, the present invention provides an apparatus for oxidizing residual combustibles within a flue gas stream that comprises in combination, a cylindrical combustion chamber with internal refractory lined wall portions and having a lower flue gas inlet section, an upper gas combustion section having a hot gas outlet passageway therefrom and a restricted diameter gas mixing zone positioned between said inlet gas section and said upper combustion section, flue gas inlet port means connecting to and discharging tangentially within the lower portion of said lower gas inlet section whereby the inlet gas stream will swirl centrifugally upwardly through said lower section, spaced air inlet ports through the end of said gas inlet section whereby to admix air with said upwardly swirling flue gas stream, axially positioned fuel burner means extending upwardly through the lower end of said gas inlet section suitable for producing a high temperature flame therein, and an open-ended refractory cylindrical-form checkerwork wall projecting concentrically around said burner means within said flue gas inlet section to within a spaced distance of said restricted diameter mixing zone of said combustion chamber, said wall being suitable to uniformly receive and distribute heat from the fuel burner means to the centrifugally moving flue gas-air stream mixture.

A preferred form of the apparatus minimizes the refractory internal lining for the high temperature inlet and combustion zones of the unit by the utilization of an external shell which in turn provides for the passage of a cooling air stream entirely therearound, whereby there may be provided simultaneously the external cooling of the metal wall of the chamber and a preheating of the air stream being introduced into admixture with the flue gas stream for the subsequent oxidation of the CO or other combustible components in such flue gas stream.

It is also a feature of the improved construction and arrangement to utilize an internal checkerwork refractory wall around a fuel gas burner means such that there is uniform mixing and heat transfer from the burner to the flue gas-air stream being mixed in the inlet and mixing sections of the unit. The waste gas stream itself is introduced into the mixing section through one or more tangential inlet ports such that there is a resulting swirling stream of gases moving upwardly through the mixing section of the unit without the need for special inlet nozzles, gas manifold means, baffles and the like to effect mechanical mixing of the flue gas stream with the air and high temperature flame and radiant heat from the burner means.

Reference to the accompanying drawing and the following description in connection therewith will serve to better set forth the construction and arrangement of the waste gas burner apparatus, as well as the advantageous features in connection therewith.

FIGURE 1 of the drawing is a sectional elevational view of a preferred form of the flue gas burner unit.

FIGURE 2 of the drawing is a sectional plan view through the lower portion of the unit, as indicated by line 2—2 in FIGURE 1.

FIGURE 3 of the drawing is a diagrammatic sectional elevational view through an updraft form of fluid heater adapted to be used above and in combination with one or more flue gas units.

Referring now more specifically to FIGURES 1 and 2 of the drawing, which show the construction arrangement of one form of the flue gas burner apparatus, there is shown an outer shell 1 spaced from the outer wall 2 of a cylindrical form of combustion chamber having an internally positioned refractory material 3. The combustion chamber wall 2 joins with a lower end plate or bottom plate 4 having superimposed insulation 5. The upper end of the unit is open providing a passageway 6, defined by the upper end portion of the liner 3 to permit the discharge of a hot gas stream. The CO containing flue gas stream, or other waste gas stream, is introduced to the burner unit through tangentially positioned inlet conduits 8 and 9, as best shown in FIGURE 2, at a level just above the bottom floor 5 of the apparatus. The result of the tangential introduction of the flue gas stream is a centrifugal swirl of the gases around the inside of inlet zone 10 to a restricted diameter mixing section 11 and thence into an enlarged diameter combustion zone 12 which in turn connects with the passageway 6 to the super-imposed heating chamber. A swaged center portion 13 of the outer wall 2 of the combustion chamber of the unit, together with the restricted diameter portion of the interior wall 3 provides the smaller diameter high velocity mixing section 11 leading to the combustion section 12.

Air or oxygen in an amount greater than the stoichiometric amount to provide complete combustion of the CO content of the stream is introduced vertically upwardly through the lower end of the combustion chamber by way of spaced air inlet ports 14 such that there is a substantially uniform introduction of oxygen into admixture with the upwardly moving centrifugal stream of flue gases. A spaced end plate 15, joining with the outer shell 1, provides a continuing air passageway 16' that communicates with the spaced air inlets 14 from the annular air passageway 16 between spaced shells 1 and 2. In accordance with the present embodiment, a cool air stream is introduced by way of a circular manifold 17 and spaced inlet conduits 18 to the upper cylindrical manifold zone 19 encompassing the combustion chamber 12 externally of the passageway section 6. Thus, the cool air stream passes in an annular downwardly moving column through annular zone 16 to the lower end zone 16' of the unit and thence upwardly through distribution passageways 14 into the lower internal inlet zone 10 of the apparatus. The downwardly moving annular column of cool air passes at a relatively high velocity and in direct heat exchange relationship with the outside of the combustion shell 2 so as to provide a cooling of the latter to permit a minimum of internal insulation 3 in both the inlet and combustion sections of the apparatus. A horizontal baffle plate 31 projecting inwardly from the shell 1 serves to channel the air stream adjacent the swaged section of the combustion chamber shell 2.

In the present embodiment, the autogenous temperature required to sustain combustion of the CO and/or other entrained combustible components in the flue gas stream is provided by a burner nozzle 20 which is in turn supplied with a fuel through line 21 and a control valve 22. A rich fuel such as methane or natural gas may be introduced through line 21 in a controlled manner to effect a high temperature flame pattern which will radiate outwardly and upwardly through the lower inlet section of the unit. Air for the burning of the methane at the burner nozzle 20 is provided through line 23, having valve 24, that connects with a cylindrical air manifold section 25. The latter is spaced from and encompasses a perforate circular baffle member 26 around conduit 21 and below nozzle 20. There is thus provided an internal air passageway section 27 in axial alignment with an open-ended cylindrical burner-block 28. The upper end of block 28 is in turn encompassed by a cylindrical wall 29 of checkerwork refractory. The latter terminates short of the mixing section 11 such that there is adequate passageway for the flue gas stream to swirl centrifugally around the checkerwork wall 29 in section 10 into the mixing zone 11 and upwardly to the combustion zone 12. The high temperature flame from the burner nozzle 20 impinges upon the interior of the checkerwork wall 29, as well as outwardly through openings 30, to provide a temperature sufficient to heat the flue gas-air stream to the order of 1500° F. or more and insure ignition and combustion of the entrained CO.

In a preferred operation, the methane or other rich fuel charged through line 21 to burner nozzle 20, together with at least about 125 percent of the theoretical amount of air required to burn the CO in the flue gas stream, is discharged into the interior of burner block 28 and the refractory checkerwork wall 29. The combustion of the rich fuel thus continues and is completed in the cylindrical-form refractory wall 29 to result in the discharge of high temperature flame and heat through the multiplicity of openings 30, as well as from the upper end portion thereof, to provide mixing of high temperature gases with the flue gas-air stream swirling upwardly from the bottom portion of the inlet section 10. After the unit has been in operation, the incoming flue gas stream and air stream are heated by radiation and by contact with the refractory checkerwork wall 29, as well as with hot gases and flame from the burner nozzle 20. After combustion of the CO is well established outside of wall 29, there may be sufficient heat retained by such wall, as well as from the burner means on the interior of the wall 29, such that there may be an appreciable reduction in the quantity of the rich gas stream being supplied to the nozzle 20. In any event, it may be noted that the present construction and arrangement provides separate fuel and air lines, 21 and 23 respectively, together with the air manifold sections 25 and 27 to permit the wide regulation and control of the temperature released from the burner nozzle 20 to the lower end of the unit.

Referring now to FIGURE 3 of the drawing, there is shown a superimposed rectangular form of heater chamber having lower side walls 32 and 32' defining a lower radiant heating section 7 and more closely spaced side walls 33 and 33' which define an upper convection zone 34. The upper end of the heater is covered with breeching or duct 35 suitable for collecting the cooled flue gas stream and for discharging it through suitable stack means not shown. A lower floor section 36 is provided with openings which in turn connect with passageway means 6 from the CO burning unit, or units, positioned therebelow. Preferably, for an elongated rectangular form of heater chamber, there are two or more spaced CO burning units utilized, such as shown and described in FIGURES 1 and 2 of the drawings.

Various means may be provided for supporting the superimposed heating chamber and the CO burning unit, however, in accordance with the present diagrammatic embodiment, there is indicated a foundation 45 with short column supports 37 spaced and arranged to support each of the lower CO burner units, while vertically elongated columns 38 of a vertical framing system, together with a horizontal beam system 39 provide means for supporting the superimposed updraft form of heating chamber.

For simplicity, the lower flue gas burner unit of FIGURE 3 is indicated as being constructed and arranged in accordance with the design of FIGURES 1 and 2, with corresponding parts being numbered in a like manner. Thus, the flue gas stream is shown as being introduced tangentially through the lower lines 8 and 9 into the lower inlet section 10 such that the stream may be centrifugally mixed with an air stream passing by way of inlet manifold 17, passageway 16 and air inlet ports 14. High temperature flame and hot gases are distributed by means of burner nozzle 20, from fuel and air inlet lines 21 and 23 respectively, against and through the cylindrical checkerwork wall 29. Resulting flue gases, air and high temperature burner gases are mixed in the upper portion of section 10 and mixing zone 11, to pass into the combustion zone 12 for the completion of the oxidation of the entrained CO or other combustibles, such that a high temperature gas stream is introduced into the lower radiant heating section 7 of the heater chamber.

There may be various positions for the fluid conduits or tube banks within the heating chamber to effect the desired transfer of usable heat to one or more fluid streams. The embodiment of the present diagrammatic drawing indicates that wall tubes 40 and 41 are positioned to obtain radiant heat from the high temperature combustion gases passing to the lower section 7. Shock tubes 42 are positioned in a conventional manner to receive both radiant and convection heat at the zone where the chamber narrows into the upper convection section 34. Tube bank 43 is arranged in the lower high temperature convection section of the upper part of the heat chamber while still another tube bank 44 is indicated as being arranged in the upper low temperature portion of the convection section to absorb heat prior to the discharge of the gases to the breeching and stack.

Various flow arrangements may also be utilized within and between tube banks or various portions of the tube banks. A single fluid stream may pass serially downwardly through the convection section and through the two portions of the radiating heating section, or alternatively, may be heated in the upper and lower convection sections and still another fluid stream in the radiant section. In another arrangement, as for example in a refinery installation, the upper low temperature convection section may be utilized to generate steam while the lower high temperature convection section and the radiant heating section may be utilized for the heating of hydrocarbon streams.

*Example*

By way of example, an elongated heater chamber having an arrangement similar to that set forth in FIGURE 3 may have five spaced CO combustion units feed hot combustion gases through their spaced passageways 6 into the lower radiant heat section 7 of the heating chamber. The five units being sized to accommodate through their respective tangential inlets 8 and 9 some 250,000 pounds per hour of flue gas from a catalytic cracking regenerator. The flue gas is introduced at a temperature of the order of 1100° F. and at 5 p.s.i.g. tain the autogenous combustion temperature therein.

Methane is introduced to the burner nozzle 20 through line 12 at the rate of 141 mols per hour while the air input for such burner and for CO oxidation, through line 23 and distributor ports 14, is at the rate of 3700 mols per hour. The resulting heat liberation from the five combustion units to the radiant heating section of the superimposed heater is of the order of 202,600,000 B.t.u.'s per hour comprising approximately 70,700,000 B.t.u.'s per hour from the sensible heat of the 1100° F. regenerator gas; 83,000,000 B.t.u.'s per hour from CO oxidation and 48,900,000 B.t.u.'s per hour from the burning of methane introduced through nozzle 20 to maintain the autogeneous combustion temperature therein.

The 141 mols per hour of methane is set forth as that amount required to sustain the 1500° F. temperature in the intermixed flue gas-air stream from mixing zone 11 into the combustion zone 12; however, as set forth hereinbefore, after the CO burning operation is well established the methane introduction may be generally reduced by virtue of the heat being generated from CO combustion in the lower inlet section 10 and mixing zone 11 around refractory wall 29. Where the flue gas stream is supplied from a regenerator of a catalytic cracking unit at a low super-atmospheric pressure there is a positive pressure to assist the upward flow of the combustion gases through the combustion units and the heater chamber; however, with an elongated convection section there may be the necessity to have a stack or connection with an existing stack to maintain an effective draft through the entire heater chamber.

I claim as my invention:

1. An apparatus for oxidizing residual combustibles in a flue gas stream which comprises in combination, a cylindrical combustion chamber with internal refractory lined wall portions and having a lower flue gas inlet section, an upper gas combustion section having a hot gas outlet passageway and a restricted diameter gas mixing zone positioned between said inlet gas section and said upper combustion section, flue gas inlet port means connecting tangentially with the lower portion of said gas inlet section whereby the inlet gas stream will swirl centrifugally upwardly through said lower section, and means for burning combustible components of said stream within said upper combustion section comprising axially positioned fuel burner means extending upwardly through the lower end of said gas inlet section suitable for producing a high temperature flame therein, air inlet means having air inlet ports through the lower end of said gas inlet section spaced around said fuel burner means, and an open-ended refractory cylindrical-form checkerwork wall projecting concentrically around said burner means within said flue gas inlet section to within a spaced distance of said restricted diameter mixing zone of said combustion chamber, said wall being suitable to receive and transmit heat from the fuel burner means and to assist in the heating and mixing of the centrifugally moving flue gas stream with air from said spaced air inlet ports.

2. The apparatus of claim 1 further characterized in that said axially positioned fuel burner means has a fuel distributing nozzle terminating at the lower end of said flue gas section within the center of a refractory cylindrical burner block which is spaced from the external periphery of the nozzle, an adjustable fuel supply means connects with said nozzle, an air distributing manifold encompasses said fuel distributing nozzle and discharges into the annular zone between the latter and the inside of said cylindrical burner block, and an adjustable air supply inlet means connects with said air manifold whereby primary air may be supplied circumferentially around said nozzle and the resulting separate adjustable introduction of fuel and air to the burner means at the end of said flue gas inlet section may provide for the regulation of the flame and temperature from the burner means to the checkerwork refractory wall adjacent the mixing section of the apparatus.

3. An apparatus for oxidizing residual combustibles in a flue gas stream which comprises in combination, a cylindrical combustion chamber with internal high temperature resistant refractory lined wall portions and having a lower flue gas inlet section, an upper gas combustion section having a hot gas outlet passageway and a restricted diameter gas mixing zone positioned between said inlet gas section and said upper combustion section, flue gas inlet port means connecting tangentially with the lower portion of said gas inlet section whereby the inlet gas stream will swirl centrifugally upwardly through said lower section, axially positioned fuel burner means extending upwardly through the lower end of said gas inlet section suitable for producing a high temperature flame therein, air inlet ports through the lower end of said gas inlet section spaced around said fuel burner means, an open-ended refractory cylindrical-form checkerwork wall projecting concentrically around said burner means to within a spaced distance of said restricted diameter mixing zone of said combustion chamber, said wall being suitable to receive and transmit heat from the fuel burner means and to assist in the heating and mixing of air from said spaced air inlet ports with the centrifugally moving flue gas stream, a confined shell having peripheral air inlet means at the upper portion thereof spaced around the outside of said combustion chamber and forming an annular passageway around and in heat exchange relationship therewith, and additional air passageway means from said annular air passageway connective with said air inlet ports spaced around said fuel burner means whereby the air passing from the upper wall portion of said shell passes around said combustion chamber to supply the air to said spaced air inlet ports to the inside of said flue gas inlet section.

4. In combination with a heater chamber for fluids having a lower radiant heating section and an upper convection heating section in vertical alignment, at least one bank of fluid conduits along the wall portions of said radiant heating section, at least one bank of fluid conduits within the upper convection heating section, a flue gas discharge means from the latter section and hot gas inlet passageway means to the bottom of said radiant heating section, the improved heating arrangement having at least one flue gas burner means positioned below and connective with said hot gas inlet passageway means of said heater chamber, with each of said burner means comprising in combination, a vertically positioned cylindrical combustion chamber with refractory lined inner wall portions and having a lower flue gas inlet section, an unobstructed upper gas combustion section with an open upper outlet end connective with said hot gas inlet passageway of said heater chamber, and a restricted diameter gas mixing zone between said flue gas inlet section and said upper combustion section, flue gas inlet port means connecting tangentially with the lower wall portion of said gas inlet section, whereby the inlet stream of gases will swirl centrifugally upwardly through such lower section, axially positioned fuel burner means extending upwardly through the lower end of said gas inlet section suitable for producing a high temperature flame centrally therein, air inlet ports through the lower end of said gas inlet section spaced around said fuel burner means, and an open-ended refractory cylindrical-form checkerwork wall projecting concentrically upwardly in said gas inlet section around said fuel burner means to within a spaced distance of said restricted diameter mixing zone in said combustion chamber, said wall adapted to receive and transmit heat from the fuel burner means and to assist in the heating and mixing of the centrifugally moving flue gas stream with incoming air and with combustion gases from the fuel burner means, a confined shell having peripheral air inlet means through the upper portion thereof spaced around said combustion chamber and forming an annular air passageway in heat exchange relationship with the outer wall of said chamber and additional air passageway from said annular passageway connective with said air inlet ports at the end of said flue gas inlet section.

References Cited by the Examiner
UNITED STATES PATENTS

| | | | |
|---|---|---|---|
| 1,730,440 | 10/29 | Smith. | |
| 2,625,916 | 1/53 | Barnes | 122—356 X |
| 2,753,925 | 7/56 | Campbell et al. | 158—1 |
| 2,790,838 | 4/57 | Schrader | 23—277 X |
| 2,840,049 | 6/58 | Durham | 122—333 |
| 3,007,512 | 11/61 | Te Nuyl et al. | |

PERCY L. PATRICK, *Primary Examiner.*

MORRIS O. WOLK, *Examiner.*